United States Patent Office 3,395,079
Patented July 30, 1968

3,395,079
PROCESS FOR THE MICROBIOLOGICAL SIDE CHAIN DEGRADATION OF 9β,10α - PREGNANE-20-ONES
Jan de Flines and Willem Frederik van der Waard, Delft, Netherlands, assignors to Koninklijke Nederlandsche Gist- en Spiritusfabriek N.V., Delft, Netherlands, a corporation of the Netherlands
No Drawing. Filed July 8, 1965, Ser. No. 470,619
Claims priority, application Great Britain, July 9, 1964, 28,361/64
4 Claims. (Cl. 195—51)

ABSTRACT OF THE DISCLOSURE

A process for the production of 17-oxygenated 9β,10α-androsta-4,6-diene-3-ones by microbiological side chain degradation of a 9β,10α - pregna-4,6,-diene-3,20-dione under the aerobic action of *Mastigosporium heterosporum* its developmental stages and enzyme systems thereof It is known that microorganisms exist which are able to convert 20-keto-steroids into steriods whic are oxygenated at carbon atom 17. Such a microbiological side chain degradation has some advantages over normal chemical methods which involve a number of complex reactions, as the microbiological side chain degradation can be carried out rather easily.

Unfortunately comparatively low yields are obtained with most of these microbiological processes.

The inventors of the underlying invention now found a new process for side chain degradation of steroids containing at carbon atom 17 an acetyl group and a hydrogen atom and in which reaction steroids are produced containing at carbon atom 17 a keto-oxygen atom, or a hydroxy group and a hydrogen atom or an acetoxy group and a hydrogen atom.

According to the invention this microbiological side chain degradation is carried out with the microorganism *Mastigosporium heterosporum*, or development stages thereof, and their enzyme systems.

The starting materials in this reaction belong to the class of normal steroids and so-called 9β,10α-steroids. With normal steroids are meant those steroids of which the hydrogen atoms and the methyl groups at the asymmetric carbon atoms 8, 9, 10, 13 and 14 have the stero chemical configuration 8β,9α,10β,13β,14α. The stero chemical configuration of these groups at the carbon atoms 8, 9, 10, 13 and 14 in the 9β,10α-steroids is the same as in di-hydro-isolumisterone. Castells et al. (Proceedings of the Chemical Society 1958, p. 7) have shown that the latter compounds has the configuration 8β,9β,10α,13β,14α. Any generic use of the expression "steroid" in this application is meant to include both the normal and the 9β,10α-steroids. Any expression using the prefix "9β,10α" refers to a steroid having at the asymmetric carbon atoms 8, 9, 10, 13 and 14 the same configuration as dihydro-isolumisterone. Further in any expression used to indicate a specific steroid and in which expression the prefix "9β,10α" does not occur the expression relates to a normal steroid.

The invention comprises a method of producing 17-oxygenated steroids by microbiological side chain degradation of 20-keto-steroids characterized in that a 20-keto-steroid is subjected under aerobic conditions to the oxygenating enzyme systems of microorganisms or development stages thereof of the class *Mastigosporium heterosporum*.

The microbiological conversions need not give rise to particular difficulties to experts in this field, since the reactions concerned may be performed in a manner known per se. For example, first a culture of the species of the fungus is caused to develop under aerobic conditions in a nutrient solution, after which a fermentation medium containing the retro-steroid to be converted, which may be added in solution or suspension, is subjected to the oxybiontic dissimilation activity of the formed mycelium. The nutrient solution comprises essentially a carbon source and a nitrogen source, for example a carbohydrate, e.g. glucose, maltose or starch and an organic nitrogen source, e.g. corn steep liquor or yeast extract, protein hydrolysates, amino-acids or an inorganic nitrogen source, e.g. ammonium salts or alkali metal nitrates. To the medium containing the steroid to be oxygenated and one or more of the aforesaid nutrient sources there may, if desired, be added an anti-foam agent for example glyceryl monostearate. The most suitable fermentation temperature usually lies between 20° C. and 28° C., but higher or lower temperatures between 15° C. and 35° C. may in general, also be applied. The time required for the conversion of the retro-steroid may vary between wide limits, but usually a period of oxygenation of 10 to 48 hours is the optimum for full conversion. the steroid obtained at the termination of the oxygenation process may be separated from the medium and/or the mycelium in any known manner, preferably by extraction with organic solvents not miscible with water, for example, diethyl ether, ethyl acetate, amyl acetate, methyl isobutyl ketone, or other suitable esters and ketones. A particularly suitable extraction agent is methyl isobutyl ketone. The steroid thus obtained may also be isolated and purified by chromatographic methods, whether or not in conjunction with extraction from the fermentation medium.

The reaction is in particular useful for the conversion of 9β,10α-pregna-4,6-diene-3,20-dione into 9β,10α-androsta-4,6-diene-3,17-dione. This product originates in relatively large amounts. Yields as high as 70% may be obtained. Besides the 3,17-dione also 9β,10α-androsta-4,6-dien-3-one-17β-ol and the corresponding 17β-acetate originate during this microbiological conversion, generally in appreciable amounts.

A particularly useful microorganism is *Mastigosporium heterosporum* Peterson A.T.C.C. 13427.

The method according to the invention is elucidated with the following example.

Example

Ingredients:
Microorganism: *Mastigosporium heterosporum* Peterson A.T.C.C. 13427.
20—20 medium: A medium consisting of tap water in which has been dissolved per 1000 ml. 20 g. of corn syrup liquor (dry substance content) and 20 g. of glucose and so much of sodium hydroxide to adjust the pH value of the medium to 6.5. The 20—20 medium has been sterilised at 120° for 20 minutes.
5—5 medium: Same medium as 20—20 medium; containing however 5 g. of corn syrup liquor and 5 g. of glucose instead of 20 g. each of these substances.

An inoculating culture of *Mastigosporium heterosporum* Peterson A.T.C.C. 13427 was prepared by adding a culture of the microorganism on oats agar to three open flasks of 2000 ml., each containing 500 ml. of the hereabove mentioned 20—20 medium.

The flasks were shaken for three days using a machine of the rotating type (stroke 2.5 cm. 250 r.p.m.). The temperature was kept at 26°. 1500 ml. of the thus obtained inoculating culture was added to a tank of 100 l. containing 60 l. of the hereabove mentioned 5—5 medium. The medium was stirred (180 r.p.m.) and aerated (7000 ml./min) at 26° C. for 24 hours. Subsequently a solution of 18 g. of 9β,10α-pregna-4,6-diene-3,20-dione dissolved in 660 mls. of acetone was added to the cultivation broth. The fermentation was continued under the same conditions as before.

40 hours after addition of the steroid solution the steroid was converted into 9β,10α-androsta-4,6-diene-3,17-dione. The mycelium was filtered off and extracted with 4 portions of 2.5 l. of methyl isobutyl ketone.

The filtrate was extracted with 3 portions of methyl isobutyl ketone. Each portion had the volume of ⅕ of the volume of the filtrate.

The extracts were collected and evaporated to a volume of 10 l. The solution thus obtained was treated with activated carbon and thereafter the solvent was distilled off in vacuo.

The residue was crystallised from mixtures (1:1) of acetone and n-heptane and from methanol and water. The yield of 9β,10α-androsta-4,6-diene-3,17-dione was 11.8 g. Melting point 188.5°–191.0° C. I.R. maxima at 1738, 1658, 1631 and 1587 cm.$^{-1}$.

The intermediates in this reaction are 17β-hydroxy-9β,10α-androsta-4,6-dien-3-one and the 17-acetate thereof.

What is claimed is:

1. process for the production of 17-oxygenated 9β,10α-androsta-4,6,diene-3-ones which comprises subjecting 9β,10α-pregna-4,6,-diene-3,20-dione under aerobic conditions to the oxygenating activity of materials selected from the group consisting of microorganisms of the species *Mastigosporium heterosporum*, its developmental stages and enzyme systems thereof, and recovering said 17-oxygenated 9β,10α-androsta-4,6-diene-3-ones.

2. The process of claim 1 wherein said 9β,10α-pregna-4,6-diene-3,20-dione is converted into a 17-ozygenated compound selected from the group consisting of 9β,10α-androsta-4,6-diene-3,17-dione, 9β,10α-androsta-4,6-diene-17β-ol-3-one and 17β-'acetoxy-9β,10α-androsta-4,6-diene-3-one.

3. The process of claim 2 wherein said microorganism *Mastigosporium heterosporum* Peterson A.T.C.C. 13427.

4. The process of claim 2 wherein said 9β,10α-pregna-4,6-diene-3,20-dione in a culture medium containing *Mastigosporium heterosporum* and nutrients, is aerated at a temperature of between 20° C. to 28° C. for a period of between 10 and 48 hours.

References Cited
UNITED STATES PATENTS

| | | |
|---|---|---|
| 2,902,410 | 9/1959 | Weintraub et al. |
| 3,198,792 | 8/1965 | Reerink et al. _____ 260—239.55 |

ALVIN E. TANENHOLTZ, *Primary Examiner.*